United States Patent [19]

Ramsden

[11] Patent Number: 4,522,724

[45] Date of Patent: Jun. 11, 1985

[54] DIAZONIUM AFFINITY MATRIXES

[75] Inventor: Hugh E. Ramsden, Scotch Plains, N.J.

[73] Assignee: J. T. Baker Chemical Company, Phillipsburg, N.J.

[21] Appl. No.: 585,783

[22] Filed: Mar. 2, 1984

[51] Int. Cl.³ .............................................. B01D 15/08
[52] U.S. Cl. .................................. 210/635; 210/656; 210/502.1; 502/157; 502/402
[58] Field of Search ..................... 210/635, 656, 198.2, 210/502.1; 502/157, 401–405, 509, 510; 55/67, 386

[56] References Cited

U.S. PATENT DOCUMENTS

| | | | |
|---|---|---|---|
| 3,892,678 | 7/1975 | Halasz et al. | 502/401 |
| 4,212,905 | 7/1980 | Tsibris | 210/656 |
| 4,213,860 | 7/1980 | Tsibris | 210/656 |
| 4,334,972 | 6/1982 | Soderberg | 210/656 |

*Primary Examiner*—John Adee
*Attorney, Agent, or Firm*—George W. Rauchfuss, Jr.

[57] ABSTRACT

Improved diazonium affinity matrixes are provided which are storable stable and may be stored for extended periods for future use. The improved affinity matrixes are diazonium silica gel affinity matrixes containing an amine linkage and especially the fluoborate salts thereof.

20 Claims, No Drawings

DIAZONIUM AFFINITY MATRIXES

FIELD OF THE INVENTION

The invention relates to the field of affinity chromatography and to affinity matrixes for use in affinity chromatography. More particularly this invention relates to improved diazonium affinity matrixes which are storage stable.

BACKGROUND OF THE INVENTION

Affinity chromatography is a separation technique based on specific and reversible molecular interactions between two biologically active substances. However, the development of affinity chromatography has been retarded to a great extent by the absence of suitable supports and the lack of adequate techniques for immobilizing ligands.

Affinity matrixes containing the diazonium group as the activator or coupling group are well known. The diazonium group is very reactive functionally for covalently bonding to phenols, aromatic amines and to sites on other reactive aromatic rings of ligands. The diazonium group is particularly good for selective bonding to the tyrosine group in proteins and peptides and the like and to other compounds of interest for affinity chromatography such as dyes, purine compounds and the like.

However, one of the major disadvantages to the more widespread use of diazonium matrixes in affinity chromatography applications is that such diazonium matrixes are normally quite unstable and generally must be prepared and used immediately. Additionally, because such diazonium matrixes on silica gels are normally made by an amide linkable using p-nitrobenzoyl chloride with aminopropyl silica gel, followed by reduction of the nitro groups and subsequent diazotization as disclosed in De Jong et al., *J. Chem. Ed.* 51(1974) 200, this produces a somewhat hydrophobic matrix that tends to bind protein non-specifically. Thus, such a diazonium matrix is somewhat unsuitable as a general affinity matrix.

Therefore, it is highly desirable that storage stable diazonium affinity matrixes be provided which are stable over extended periods and thus can be stored for future use. It is also desirable that such diazonium affinity matrixes be more hydrophilic and thus bind protein more specifically and thereby be more useful as general affinity matrixes.

SUMMARY OF THE INVENTION

The novel affinity matrixes of this invention are diazonium silica gel affinity matrixes of the formula

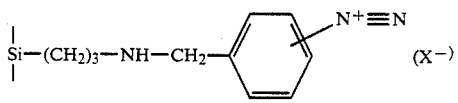

(Formula I)

wherein

represents a silica gel and (X⁻) is any suitable anion such as for example, chloride or fluoborate.

Especially preferred are the fluoborate salts of the formula

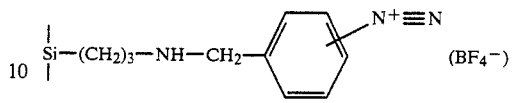

(Formula II)

The novel diazonium silica gel affinity matrixes of the above formula are prepared by condensing an aminopropyl silica gel with nitrobenzaldehyde to form a Schiff's base of the formula

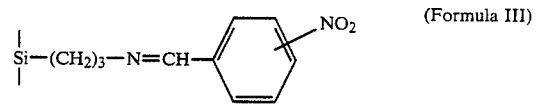

(Formula III)

and reducing said Schiff's base with sodium borohydride to remove the C=N linkage and also reducing the nitro group with sodium borohydride or sodium dithionite to form a compound of the formula

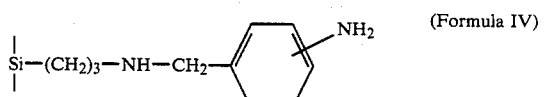

(Formula IV)

which is then diazotized with hydrochloric acid and sodium nitrite, for example, to form a diazonium silica gel affinity matrix of Formula I. Where the fluoborate salt of Formula II is desired, the diazotization reaction is carried out with fluoboric acid (HBF₄) or sodium fluoborate (NaBF₄) with sodium nitrite.

All the reactants for the above described reactions, including the aminopropyl silica gel are commercially available. Silica gel suitable for use in forming the matrixes of this invention is any particulate silica gel having an average particle diameter of from about 3 to about 200 microns and an average pore size of from about 50 to about 1000 Angstrom units. Such silica gel, consisting of amorphous silica, is commercially available in irregular and spherical particulate forms. Where the affinity matrix product of this invention is to be used in chromatographic columns a silica gel of from about 3 to about 70 microns average diameter is generally employed whereas if the affinity matrix product of this invention is to be used in a batch separation medium, such as a test tube or the like silica gel of from about 3 to about 200 microns average diameter can be employed.

The diazonium silica gel affinity matrixes of Formulas I and II of this invention can be used as an affinity matrix for attaching to any ligand which covalently bonds to the affinity matrix. The affinity matrix is especially useful for covalently bonding with ligands having reactive phenols and are also quite useful for reacting with ligands having other reactive groups, such as for example, reactive aromatic ligands containing amine groups or other reactive aromatic rings. The diazonium affinity matrixes of this invention readily react with such reactive groups of a protein, enzyme or other such ligand to yield the ligand immobilized on the diazonium silica gel matrix. As examples of ligands containing such reactive groups which can be covalently bound by use of the affinity matrix of this invention there can be mentioned for example antigens, antibodies, enzymes, inhibitors, cofactors, hormones, vitamins, toxins, growth factors, glycoconjugates, lectins, nucleic acids and proteins which are known in the art. Most preferably the ligand bound affinity matrixes of this invention are employed to purify or separate substances, such as proteins and the like, from solutions containing such a substance by reacting said substance in solution with such ligand covalently bound to the diazonium silica gel matrixes of this invention.

The fluoborate salts of diazonium silica gel matrixes of Formula II are stable and can be stored for extended periods for future use whereas the diazonium silica gel matrixes of Formula I other than the fluoborate salts are not nearly as stable and should be used shortly after preparation. In any event all the diazonium silica gel matrixes of this invention whether the preferred fluoborate salts or not, are characterized by increased hydrophilicity due to the amine linkage present and thus tend to bind proteins more specifically than heretofore known diazonium silica gel affinity matrixes.

The diazonium silica gel affinity matrixes of this invention, their preparation and the use thereof to covalently bond to ligands is illustrated but not limited by the following Examples.

EXAMPLE 1 p-Diazobenzylaminopropyl Silica Gel

Aminopropylsilica gel (containing 0.64% N, 40μ size, 250Å pore), 50 grams, in 300 ml methanol was treated with 6.9 grams of p-nitrobenzaldehyde for about 2 hours and 30 minutes on a laboratory shaker. the mixture was filtered, the silica gel washed with 200 ml portions of methanol twice.

The resulting moist solid was suspended in 300 ml of methanol and sodium borohydride was added with stirring portionwise (3.5 grams, 10 minutes later 3.5 grams, then after 10 minutes another 2.5 grams for a total of 9.5 grams). Stirring was continued for about 48 minutes until effervescence subsided. Then the mixture was filtered, washed with 200 ml methanol twice and once with 200 ml ethyl ether and oven dried at about 80° C. for about 1½ hours. Analysis showed 0.99% nitrogen in the resulting p-aminobenzylamino propyl silica gel. Five grams of said silica gel product was added to 50 ml ice cold 2 N HCL followed by 1.25 grams of sodium nitrite. The mixture was shaken in an ice bath and kept under vacuum for about 30 minutes. It was then filtered, the silica gel washed with 100 ml ice cold water three times, allowed to stand with 50 ml ice cold 1% sulfamic acid for about 15 minutes, filtered and the resulting silica gel washed with 100 ml ice water three times to produce the chloride salt of p-diazobenzylaminopropyl silica gel.

EXAMPLE 2

Trypsin Bound p-diazobenzylaminopropyl Silica Gel

To the final silica gel product of Example 1 was added 50 ml of a phosphate buffer (pH 7) containing 500 mg trypsin. This was then refrigerated with occasional stirring for about 2 hours and 50 minutes, filtered and washed with 100 ml portions ice water three times. The product was stored in pH 7 buffer. Testing for trypsin activity showed the product to be very active.

EXAMPLE 3 m-Diazobenzylaminopropyl Silica Gel

By the process described in Example 1, the aminopropylsilica gel starting material was condensed with m-nitrobenzaldehyde instead of p-nitrobenzaldehyde and reduced as described to m-aminobenzylaminopropyl silica gel (Analysis showed 0.99% N) which was then diazotized as described to produce the chloride salt of m-diazobenzylaminopropyl silica gel.

EXAMPLE 4

Trypsin Bound m-diazobenzylaminopropyl Silica Gel

By the process described in Example 2 the chloride salt of m-diazobenzylaminopropyl silica gel obtained in Example 3 was covalently bound to trypsin to produce the trypsin derivative thereof which was shown to have trypsin activity when tested for such action.

EXAMPLE 5

Fluoroborate Salt of p-diazobenzylaminopropyl Silica Gel (narrow-pore)

By the process described in Example 1, aminopropyl silica gel (0.62% N, 40μ size, narrow-pore) was converted to p-aminobenzylaminopropyl silica gel. Analysis 1.02%N. Ten grams of the p-aminobenzylaminopropyl silica gel was treated with 100 ml of ice cold 2N HBF$_4$ and 2.5 grams of sodium nitrite in an ice bath under vacuum for about 30 minutes with occasional shaking. The resulting product was filtered, washed with 100 ml ice water three times and dried under vacuum to give the desired diazonium fluoborate product.

EXAMPLE 6

Naphthol Bound p-diazobenzylaminopropyl Silica Gel (narrow pore)

Mixing 100 mg of the fluoborate salt of p-diazobenzylaminopropyl silica gel produced in Example 5 in 4 ml pH 8.0 buffer to which was added 0.5 ml 1.0 N sodium hydroxide with 1 ml saturated β-naphthol in methanol produced a deep orange color deepening over several hours to dark brown thereby evidencing the covalent bonding of naphthol to the diazonium silica gel.

After storing the fluoborate salt of p-diazobenzylaminopropyl silica of Example 5 for about 6 weeks, the above-described reaction with β-naphthol was repeated and again produced a deep orange color deepening over several hours to dark brown thereby evidencing the storage stability of the fluoborate salt.

EXAMPLE 7

Fluoborate salt of p-diazobenzylamino propyl Silica Gel (wide pore)

24.9 Grams of aminopropyl silica gel (70μ, wide-pore, 2.05% N) was allowed to react with 11 grams of p-nitrobenzaldehyde in about 200 ml methanol for about 21 hours on a shaker. After filtration and washing, it was resuspended in 300 ml of methanol and reduced with 8 grams of sodium borohydride added portionwise over a period of 30 minutes. Stirring was continued for about an additional 30 minutes. After filtration and washing the product was dried in a desiccator overnight. 28.3 Grams of product was suspended in 150 ml of 20% sodium dithionite at 60° C. (steam bath) for about 55 minutes, filtered, washed with 150 ml of water twice, once with 150 ml of 30% acetic acid, let stand for 10 minutes, then 150 ml water twice, 200 ml of methanol twice, and oven dried at about 80° C. for about 1 hour.

Ten grams of this product were treated with 100 ml of ice cold 2 N HBF$_4$ and 2.5 grams of sodium nitrite in an ice bath under vacuum for about 30 minutes with occasional shaking. It was filtered, washed with 100 ml ice water twice and dried under vacuum to give the desired diazonium fluoborate product.

EXAMPLE 8

Naphthol Bound p-diazobenzylaminopropyl Silica Gel (wide pore)

Mixing 100 mg of the fluoborate salt of p-diazobenzylaminopropyl silica gel produced in Example 7 in 4 ml pH 8.0 buffer to which was added 0.5 ml 1.0 N sodium hydroxide with 1 ml saturated β-naphthol in methanol produced a deep orange color deepening over several hours to dark brown thereby evidencing the covalent bonding of naphthol to the diazonium silica gel.

EXAMPLE 9

Fluoborate Salt of p-diazobenzylaminopropyl Silica Gel (narrow pore)

In accordance with the process described in Example 7, 35 grams of 1.9% N aminopropyl silica gel (40μ size, narrow pore) was converted to p-aminobenzylaminopropyl silica gel and ten grams thereof was diazotized to the desired diazonium product.

The grams of said p-aminobenzylaminopropyl silica gel product was added to 50 ml ice cold 2 N HBF$_4$ followed by 1.25 of sodium nitrite. The mixture was shaken in an ice bath and kept under vacuum for about 30 minutes. It was then filtered, the silica gel washed with 100 ml ice cold water three times, allowed to stand with 50 ice cold 1% sulfamic acid for about 15 minutes, filtered and the resulting silica gel washed with 100 ml ice cold 3–4% HBF$_4$ three times to produce the fluoborate salt of p-diazobenzylaminopropyl silica gel (narrow-pore).

EXAMPLE 10

Fluoborate Salt of m-diazobenzylaminopropyl Silica Gel (narow-pore)

By the process described in Example 3, 50 grams of aminopropyl silica gel (40μ size, narrow-pore) was converted to m-aminobenzylaminopropyl silica gel and this silica gel was then converted to the diazonium fluoborate thereof by treating ten grams of this m-aminobenzylaminopropyl silica gel with 100 ml of ice cold 2N NBF$_4$ and 2.5 grams of sodium nitrite in an ice bath under vacuum for about 30 minutes with occasional shaking. The resulting product was filtered, washed with 100 ml ice cold 3–4% HBF$_4$ three times, with 200 ml ice water twice and 200 ml methanol twice and dried under vacuum to give the desired diazonium fluoborate product.

EXAMPLE 11

Fluoborate Salt of p-diazobenzylaminopropyl Silica Gel (40μ, narrow-pore)

By the process described in Example 1, 50 grams of aminopropyl silica gel (40μ, narrow-pore) was converted to p-aminobenzylaminopropyl silica gel and this product was converted to the desired diazonium fluoborate by treating ten grams of this p-aminobenzylaminopropyl silica gel with 100 ml of ice cold 2N HBF$_4$ and 2.5 grams of sodium nitrite in an ice bath under vacuum for about 30 minutes with occasional shaking. The resulting product was filtered, washed with 100 ml ice cold 3–4% HBF$_4$ three times, with 200 ml ice water twice and 200 ml methanol twice and dried under vacuum to give the desired diazonium fluoborate product.

EXAMPLE 12

Fluoborate Salt of p-diazobenzylaminopropyl Silica Gel (40μ, narrow-pore)

By the process described in Example 1, 50 grams of aminopropyl silica gel (40μ, narrow-pore) was converted to p-aminobenzylaminopropyl silica gel and this product was converted to the desired diazonium fluoborate by treating ten grams of the p-aminobenzylaminopropyl silica gel with 100 ml of ice cold 2N HBF$_4$ and 2.5 grams of sodium nitrite dissolved in 10 ml ice water under vacuum for about 30 minutes with occasional shaking. The resulting product was filtered and washed with 100 ml of ice cold 3–4% HBF$_4$ three times and dried under vacuum to give the desired diazonium fluoborate product.

EXAMPLE 13

Fluoborate of p-diazobenzylaminopropyl Silica Gel (40μ, narrow-pore)

By the process described in Example 1, aminopropyl silica gel (0.62% N, 40μ size, narrow-pore) was converted to p-aminobenzylaminopropyl silica gel. Analysis 1.02% N. Ten grams of this product was treated with 100 ml ice cold 2 N HCL and 2.5 grams of sodium nitrite in an ice bath under vacuum for about 30 minutes with occasional shaking. The resulting product was filtered, washed with 100 ml ice water three times, treated for 15 minutes with 50 ml of 1% sulfamic acid (refrigerated), filtered, washed with 100 ml ice water, then allowed to stand for 10 minutes in 100 ml saturated sodium fluoborate. The product was dried under vacuum. The resulting fluoborate of p-diazobenzylaminopropyl silica gel product was stored in dry form.

EXAMPLE 14

Naphthol Bound p-diazobenzylaminopropyl Silica Gel

Mixing 100 mg of the fluoborate salt of p-diazobenzylaminopropyl silica gel produced in Example 13 in 4 ml pH 8.0 buffer to which was added 0.5 ml 1.0 N sodium hydroxide with 1 ml saturated β-naphthol in methanol produced a deep orange color deepening over several hours to dark brown thereby evidencing the covalent bonding of naphthol to the diazonium silica gel.

I claim:

1. An aminobenzylaminopropyl silica gel of the formula

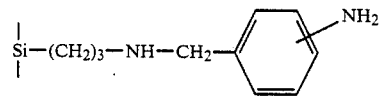

wherein

is a silica gel.

2. A diazobenzylaminopropyl silica gel of the formula

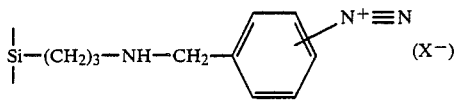

wherein

is a silica gel and X⁻ is an anion.

3. A diazobenzylaminopropyl silica gel of claim 2 wherein (X⁻) is selected from the group consisting of chloride or fluoborate radicals.

4. A diazobenzylaminopropyl silica gel of claim 3 having the formula

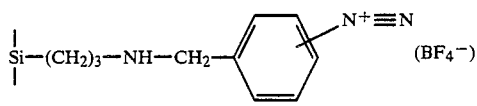

5. A diazobenzylaminopropyl silica gel of claim 4 which is a fluoborate salt p-diazobenzylaminopropyl silica gel.

6. A diazobenzylaminopropyl silica gel of claim 4 which is a fluoborate salt of m-diazobenzylaminopropyl silica gel.

7. In a method of separating or purifying a substance from a solution by reacting the substance in the solution with an affinity matrix having a ligand covalently bound to the affinity matrix, the improvement comprising employing an diazobenzylaminopropyl silica gel of claim 2 as the affinity matrix.

8. In a method of separating or purifying a substance from a solution by reacting the substance in the solution with an affinity matrix having a ligand covalently bound to the affinity matrix, the improvement comprising employing an diazobenzylaminopropyl silica gel of claim 3 as the affinity matrix.

9. In a method of separating or purifying a substance from a solution by reacting the substance in the solution with an affinity matrix having a ligand covalently bound to the affinity matrix, the improvement comprising employing an diazobenzylaminopropyl silica gel of claim 4 as the affinity matrix.

10. In a method of separating or purifying a substance from a solution by reacting the substance in the solution with an affinity matrix having a ligand covalently bound to the affinity matrix, the improvement comprising employing an diazobenzylaminopropyl silica gel of claim 5 as the affinity matrix.

11. In a method of separating or purifying a substance from a solution by reacting the substance in the solution with an affinity matrix having a ligand covalently bound to the affinity matrix, the improvement comprising employing an diazobenzylaminopropyl silica gel of claim 6 as the affinity matrix.

12. A diazobenzylaminopropyl silica gel of claim 2 wherein the silica gel has an average particle diameter of from about 3 to about 70 microns and an average pore size of from about 50 to about 1000 Angstrom units.

13. A diazobenzylaminopropyl silica gel of claim 3 wherein the silica gel has an average particle diameter of from about 3 to about 70 microns and an average pore size of from about 50 to about 1000 Angstrom units.

14. A diazobenzylaminopropyl silica gel of claim 4 wherein the silica gel has an average particle diameter of from about 3 to about 70 microns and an average pore size of from about 50 to about 1000 Angstrom units.

15. A diazobenzylaminopropyl silica gel of claim 5 wherein the silica gel has an average particle diameter of from about 3 to about 70 microns and an average pore size of from about 50 to about 1000 Angstrom units.

16. A diazobenzylaminopropyl silica gel of claim 6 wherein the silica gel has an average particle diameter of from about 3 to about 70 microns and an average pore size of from about 50 to about 1000 Angstrom units.

17. In a method of separating or purifying a substance from a solution by reacting the substance in the solution with an affinity matrix having a ligand covalently bound to the affinity matrix, the improvement comprising employing an diazobenzylaminopropyl silica gel of claim 12 as the affinity matrix.

18. In a method of separating or purifying a substance from a solution by reacting the substance in the solution with an affinity matrix having a ligand covalently bound to the affinity matrix, the improvement comprising employing an diazobenzylaminopropyl silica gel of claim 13 as the affinity matrix.

19. In a method of separating or purifying a substance from a solution by reacting the substance in the solution with an affinity matrix having a ligand covalently bound to the affinity matrix, the improvement comprising employing an diazobenzylaminopropyl silica gel of claim 14 as the affinity matrix.

20. In a method of separating or purifying a substance from a solution by reacting the substance in the solution with an affinity matrix having a ligand covalently bound to the affinity matrix, the improvement comprising employing an diazobenzylaminopropyl silica gel of claim 15 as the affinity matrix.

* * * * *